Figure 1:
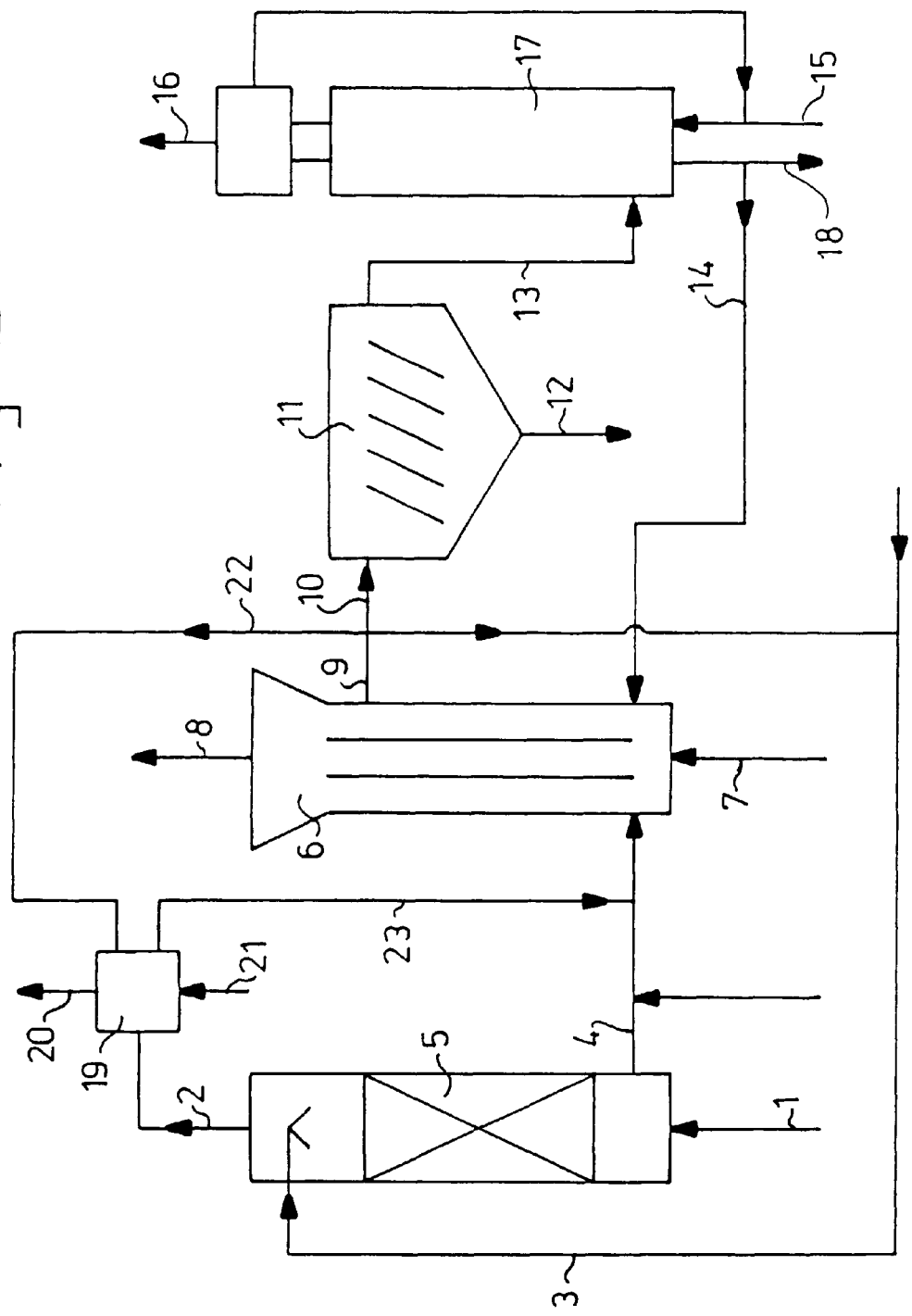

United States Patent [19]
Buisman

[11] Patent Number: 5,976,868
[45] Date of Patent: Nov. 2, 1999

[54] PROCESS FOR THE TREATMENT OF GASES

[75] Inventor: Cees Jan Nico Buisman, Harich, Netherlands

[73] Assignee: Paques Bio Systems B.V., Balk, Netherlands

[21] Appl. No.: 08/981,722
[22] PCT Filed: Mar. 25, 1996
[86] PCT No.: PCT/NL96/00126
§ 371 Date: Dec. 23, 1997
§ 102(e) Date: Dec. 23, 1997
[87] PCT Pub. No.: WO96/30110
PCT Pub. Date: Oct. 3, 1996

[30] Foreign Application Priority Data

Mar. 24, 1995 [NL] Netherlands ............................ 9500577

[51] Int. Cl.⁶ .................................................. A61L 9/01
[52] U.S. Cl. .................... 435/266; 423/226; 423/242.1; 423/519.2; 423/544; 423/563; 423/576.2; 435/289.1
[58] Field of Search ................................ 210/601, 603, 210/610, 611, 620, 621, 622, 630, 194, 196, 294; 423/220, 221, 226, 242.1, 243.01, 519.2, 539, 544, 563, 576.2, 576.4; 435/262, 262.5, 266, 282, 289.1

[56] References Cited

U.S. PATENT DOCUMENTS

| | | | |
|---|---|---|---|
| 5,269,929 | 12/1993 | Sublette et al. | 210/610 |
| 5,354,545 | 10/1994 | Buisman | 423/242.1 |
| 5,366,633 | 11/1994 | Buisman | 210/614 |

FOREIGN PATENT DOCUMENTS

| | | |
|---|---|---|
| 58-027619 | 2/1983 | Japan . |
| WO 91/16269 | 10/1991 | WIPO . |
| WO 92/10270 | 6/1992 | WIPO . |
| WO 93/24416 | 12/1993 | WIPO . |

OTHER PUBLICATIONS

"Exploiting nature's sulphur cycle", *Sulphur Metabolizing Bacteria*, Sulphur No. 235, Nov. 1994, pp. 59–63, 65–67 and 69.

*Primary Examiner*—David A. Redding
*Attorney, Agent, or Firm*—Young & Thompson

[57] ABSTRACT

An installation and a method are described for the treatment of a gas containing hydrogen sulphide, the gas (1) being washed in a first gas scrubber (5) with an alkaline wash liquid and the spent wash liquid (4) being treated in an aerobic reactor (6) with oxygen in the presence of sulphide-oxidising bacteria and the effluent (9) from the aerobic reactor (6) being re-used as wash liquid (3) and the elementary sulphur formed during the treatment with oxygen being removed from the effluent (19), the effluent (13) from which sulphur has been removed being treated in an anaerobic reactor (17) with sulphate-reducing bacteria and returned to the aerobic reactor (6). The installation and the method can also be used for simultaneous removal of $SO_2$, COS, $CS_2$, $NH_3$ and HCN.

12 Claims, 2 Drawing Sheets

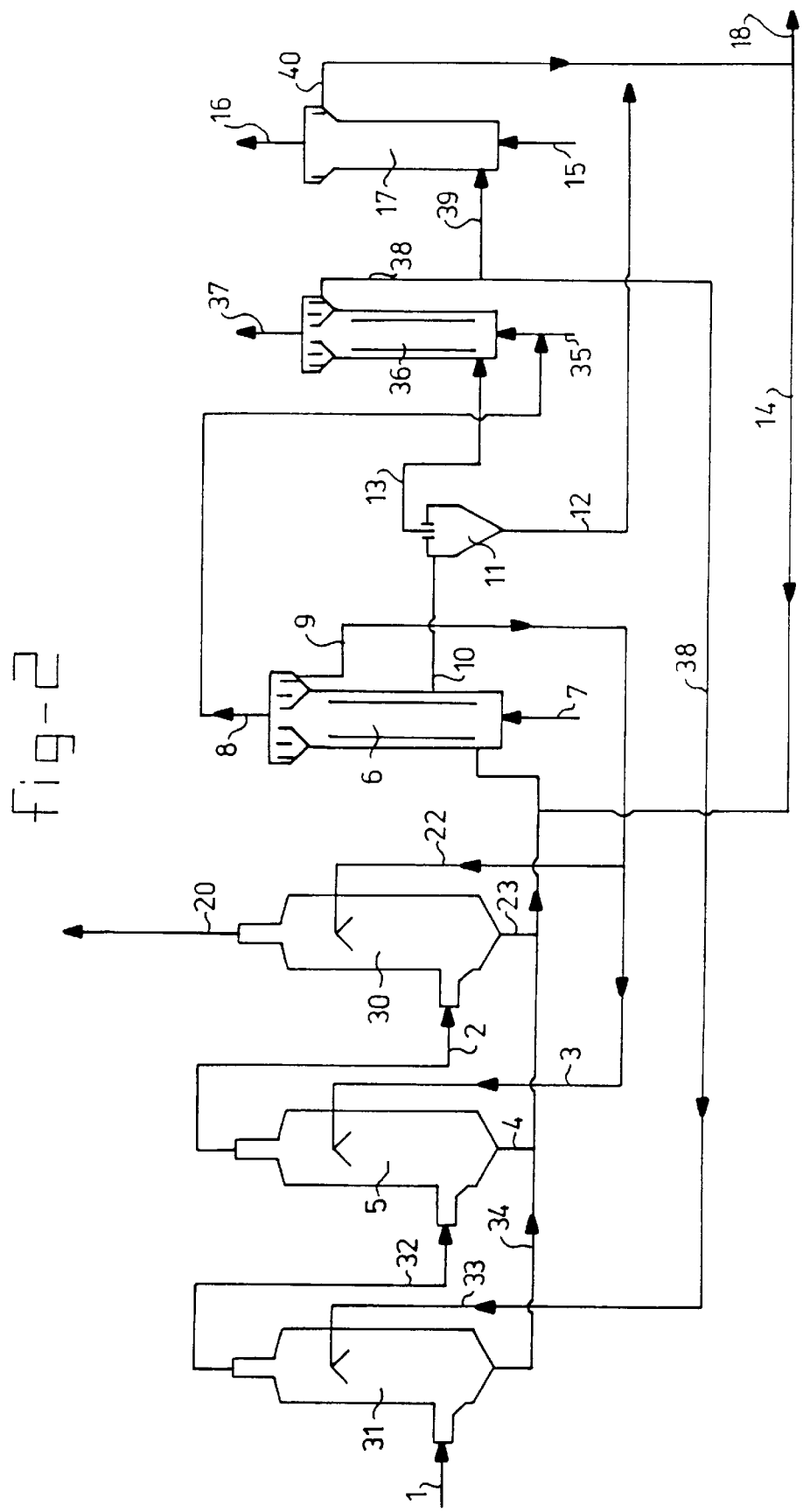

PROCESS FOR THE TREATMENT OF GASES

The invention relates to a process for the treatment of a gas containing hydrogen sulphide and optionally other pollutants, the gas being washed in a first gas scrubber with an alkaline wash liquid and the spent wash liquid being treated in a first aerobic reactor with oxygen in the presence of sulphide-oxidising bacteria and the effluent from the first aerobic reactor being re-used as wash liquid and elementary sulphur formed during the treatment with oxygen being removed from the effluent.

A process of this type is disclosed in International Patent Application WO 92/10270. This process is suitable for the removal of hydrogen sulphide ($H_2S$) and optionally other reduced sulphur compounds, such as mercaptans and carbon disulphide, or for the removal of sulphur dioxide ($SO_2$).

A disadvantage of the known method is that small amounts of sulphate are produced during the biological oxidation of sulphide and that no solution is provided for preventing the undesired accumulation thereof. The known method is also not suitable for the removal of other pollutants which can be present in addition to $H_2S$, such as ammonia ($NH_3$), hydrocyanic acid (HCN), sulphur dioxide ($SO_2$), carbonyl sulphide (COS) and/or carbon disulphide ($CS_2$).

A process has now been found for the treatment of gases, which allows removal of hydrogen sulphide without appreciable residues and which also allows other undesirable gaseous components frequently encountered, such as ammonia, hydrocyanic acid, sulphur dioxide, carbon disulphide or carbonyl sulphide, to be removed without separate pretreatment or post-treatments and associated installations being required for this. The process produces only solid elementary sulphur and, if the gas to be treated also contains nitrogen compounds such as $NH_3$ or HCN, molecular nitrogen ($N_2$), both of which can be used or discharged without any drawbacks. The process is particularly suitable for the treatment of fuel gases (natural gas, coal gas) and other gases which are usefully used after treatment. The process is also suitable for the treatment of gases which will no longer be used and ultimately will be discharged, optionally after burning off, such as flue gases and industrial gases, for example Claus off-gases (gases which are produced during the reaction of high concentrations of $H_2S$ with $SO_2$ with the formation of elementary sulphur).

The process according to the invention is characterised in that the effluent from the first aerobic reactor, from which sulphur has been separated off, is treated in an anaerobic reactor with sulphate-reducing bacteria and returned to the first aerobic reactor.

As a result of the use of the anaerobic reactor connected downstream of the aerobic reactor, the sulphate which leaves the aerobic reactor is reduced to sulphide. When the gas to be treated contains sulphur dioxide in addition to hydrogen sulphide, this sulphur dioxide (in the form of sulphite or sulphate) is reduced to sulphide as well.

The bacteria which are active for reduction of sulphate and sulphite and other oxidised sulphur compounds in the anaerobic reactor (designated here as sulphate-reducing bacteria) are, for example, bacteria of the genera Desulfovibrio, Desulfotomaculum, Desulfomonas, Desulfobulbus, Desulfobacter, Desulfococcus, Desulfonema, Desulfosarcina, Desulfobacterium and Desulfuromonas. Bacteria of this type are available without any problem from diverse anaerobic cultures and/or grow spontaneously in the anaerobic reactor.

Reduction equivalents (electron donors) are needed for the biological reduction in the anaerobic reactor. Suitable electron donors are, inter alia, hydrogen, carbon monoxide, lower alcohols (for example methanol and ethanol) and other organic substances which can easily be oxidised by biological means, such as acetate, propionate, glucose, sucrose, starch and the like.

The sulphide-containing effluent from the anaerobic reactor is recycled to the aerobic reactor, where the sulphide is again largely converted into elementary sulphur.

The amount of oxygen fed to the aerobic reactor is regulated such that it is in the main elementary sulphur which is produced on oxidation of the absorbed sulphide.

Suitable bacteria which oxidise sulphide and other sulphur compounds having a low degree of oxidation to elementary sulphur in the aerobic reactor in the presence of oxygen (designated here as sulphide-oxidising bacteria) are the autotrophic aerobic cultures known for this purpose, such as the autotrophic aerobic cultures of the genera Thiobacillus and Thiomicrospira.

The formation of sulphur in the aerobic reactor leads to a sulphur suspension, which is tapped off. The sulphur from this suspension is separated off and worked up by drying and, optionally, purifying, and re-used.

Approximately 90% of the alkalinity used in the gas scrubber is re-formed during the oxidation in the aerobic reactor. The bulk of the other 10% of the alkalinity is re-formed in the anaerobic reactor.

A portion of the effluent from the aerobic reactor is recycled to the gas scrubber as wash liquid. Preferably, said effluent has a pH of 7.5–9.5, in particular of 8–9.2. A relatively high pH, such as between 9 and 9.5, has the advantage that bicarbonate ($CO_2$) stays better in solution and the buffer action is thus more effective. Elementary sulphur is more stable at a lower pH of, for example, 8–8.5.

If necessary, the pH is adjusted by adding alkali or sodium carbonate. If the gas to be treated contains little $CO_2$, as in the case of natural gas, (<5% $CO_2$), $CO_2$ or an equivalent thereof, such as (bi)carbonate, is preferably added, both to adjust the pH and to increase the buffer action. This addition can be made in the aerobic reactor so that the pH is adjusted to the desired value in this reactor, or can be made in the (first) gas scrubber. An organic electron donor, such as acetate, sugars, and the like, can also be introduced into the anaerobic reactor, where it is converted into (bi)carbonate by the bacteria present in said reactor. In this way the electron-donating, pH-raising and buffer functions are combined.

In general, neutralising agents are not needed to lower the pH downstream of the scrubber and, therefore, hardly any salts build up in the recirculating wash liquid.

Because the effluent from the aerobic reactor, from which the elementary sulphur has not yet been separated off or has not yet been completely separated off, is preferably used as wash liquid, the wash water contains elementary sulphur which promotes the absorption of $H_2S$, but also of $SO_2$ and HCN, from the gases to be treated. This leads to the formation of, respectively, disulphide and polysulphide ($HS_n^-$; $n \geq 2$), thiosulphate ($HS_2O_3^-$) and thiocyanate ($SCN^-$). Preferably, the wash liquid contains 1–50, in particular 10–50 g elementary sulphur per l.

Elementary sulphur in the wash liquid is useful especially in the case where HCN is present as a component in the gas. The cyanide, which is toxic to the majority of bacteria, is converted by the elementary sulphur into the far less toxic thiocyanate, which is then broken down biologically and/or chemically as can be seen from the following reaction equations:

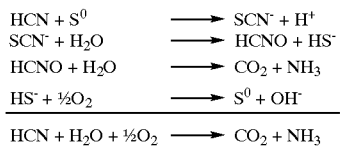

$$HCN + H_2O + \tfrac{1}{2}O_2 \longrightarrow CO_2 + NH_3$$

Thus, HCN is ultimately converted to carbon dioxide and ammonia. The ammonia can be further reacted, if desired, as explained below.

When the gas to be treated contains other volatile sulphur compounds, such as lower alkyl mercaptans or carbon disulphide, in addition to $H_2S$, the spent wash liquid which contains the sulphur compounds can be fed directly into the aerobic reactor containing the sulphide-oxidising bacteria. When the reduced sulphur compounds have dissolved, they are termed "sulphide", but this term is also understood to include other reduced sulphur compounds, such as dissolved hydrogen sulphide ($H_2S$ or $HS^-$), disulphide, polysulphide, thiocarbonates, alkanethiolates, and the like.

If the gas also contains $CO_2$, the latter will also be partially absorbed in the wash liquid. The absorbed carbon dioxide will, in the form of bicarbonate, have a favourable buffer action on the wash liquid. Moreover, some of the $CO_2$ will be stripped in the aerobic reactor, which leads to a rise in pH.

The sulphide concentration in the spent wash liquid, which has a pH of about 8.5, will usually be, expressed as sulphur, approximately 80–800 mg/l when treating gases under approximately atmospheric pressure. This is a lower concentration than the concentration reached in a conventional $H_2S$ scrubber operating at a pH of 10 to 11. The scrubber will therefore have to be larger than a conventional scrubber and a higher water/gas stream ratio will be used, for example a ratio of water stream to gas stream of 0.1 to 0.25. In the case of compressed gases, such as fuel gas (under, for example, 20 bar) or natural gas (under, for example, 75 bar), the sulphide concentration can rise to 3 g/l and the requirements in respect of the scrubber and the water/gas ratio are thus less stringent.

The process according to the invention has advantages in particular for the treatment of gases which contain appreciable amounts of other undesirable components. An important additional pollutant is ammonia. When gas has to be treated which in addition to $H_2S$ (and possibly $SO_2$) also contains ammonia, this will to a certain extent be absorbed in the gas scrubber discussed and reacted in the aerobic reactor.

However, it is preferable, if it is desired drastically to restrict the quantity of ammonia to be discharged, to use a second gas scrubber, connected upstream of the first, and to wash the gas in said second scrubber using a wash liquid of a lower pH. In this way $NH_3$ is washed out more efficiently. With this arrangement, the wash liquid in the second gas scrubber preferably has a pH of 5 to 7.5 and in particular of 6–7. Preferably, the gas is first washed in the second gas scrubber which has the lower pH, mainly with a view to absorption of $NH_3$, and is then washed in the gas scrubber described first which has the higher pH, especially with a view to absorption of $H_2S$.

The spent wash liquid from the second gas scrubber can then be combined with the spent wash liquid from the first gas scrubber and subjected successively to biological oxidation and reduction. A large proportion of the ammonia will not be converted in the aerobic reactor where sulphide is oxidised. That is why a second aerobic reactor is preferably used, said second reactor being fed with the effluent from the first aerobic reactor, from which elementary sulphur has been separated off as far as possible.

In said second aerobic reactor, ammonia is converted to nitrate by nitrifying bacteria in the presence of oxygen. A portion of the effluent from the nitrifying aerobic reactor is then fed into the anaerobic reactor which has already been discussed, where the nitrate is reduced to nitrogen by denitrifying bacteria in the presence of an electron donor, such as hydrogen. The effluent from the anaerobic reactor is recycled to the first aerobic reactor, as already described above. The following reactions occur:

(1) $NH_4^+ + 2O_2 \to NO_3^- + 2H^+ + H_2O$ second aerobic reactor
(2) $2NO_3^- + 5H_2 \to N_2 + 4H_2O + 2OH^-$ anaerobic reactor
(3) $2NO_3^- + 5HS^- + H_2O \to N_2 + 5S^0 + 7OH^-$ first aerobic reactor As the pH of the effluent from the second aerobic reactor has been lowered as a result of nitrate formation, a portion of this effluent is advantageously used as wash liquid for the second gas scrubber. If necessary, the pH can be further adjusted by adding acid or base or by mixing with other effluents. The nitrate can then be partially converted to molecular nitrogen (reaction (3)) in the first aerobic reactor.

The process according to the invention is also outstandingly suitable for use for the treatment of gas which also contains hydrocyanic acid in addition to $H_2S$ (and possibly $SO_2$ and/or $NH_3$). As already described, the absorption of the HCN can be promoted by means of elementary sulphur dissolved or suspended in the wash liquid. In the case of two gas scrubbers as described above, the HCN will be absorbed mainly in the first, more alkaline gas scrubber (connected downstream of the second gas scrubber). The nitrate formed is ultimately converted to nitrogen by the combination of anaerobic and aerobic reactors.

If the gas to be treated contains carbon disulphide and/or carbonyl sulphide, the latter can likewise be effectively removed using the process according to the invention. In this case more than one gas scrubber is preferably used, as has been described above for the removal of ammonia. For very thorough removal of COS, two gas scrubbers of the alkaline type are used in series, it being possible to use effluent from the first aerobic reactor as wash liquid for both scrubbers. Absorbed COS and $CS_2$ is essentially converted into carbonate and sulphur in the aerobic reactor.

The gas scrubbers to be used according to the invention can be of a conventional type, provided effective contact between the gas stream and the wash liquid is produced in the gas scrubbers.

The anaerobic and aerobic reactors to be used according to the invention can be of any suitable type. Reactors of the vertical circulating type, such as are described, for example, in International Patent Application 94/29227, in which the gas to be used (this is usually air in the aerobic reactor) can provide for vertical circulation, are preferably used, in particular for the aerobic reactor(s).

The invention also relates to an installation for carrying out the process as described above.

In the accompanying drawings:

FIG. 1 is a flow diagram of an installation for carrying out the process according to the present invention; and FIG. 2 is a view similar to FIG. 1 but showing a modified embodiment thereof.

EXAMPLES AND DESCRIPTION OF THE FIGURES

EXAMPLE 1

Removal of sulphur compounds in the absence of significant amounts of nitrogen compounds Claus off-gas (approx. 40% $CO_2$, 45% $H_2O$, 8% $N_2$) containing $H_2S$ and $SO_2$ as the main pollutants and additionally containing COS and $CS_2$ is treated in an installation as shown in FIG. 1.

The polluted gas enters gas scrubber 5 at the bottom via line 1. The clean gas leaves the scrubber at the top via line 2. The gas is treated using wash liquid which is supplied via 3. The wash liquid laden with sulphide and, possibly, sulphite leaves the scrubber at the bottom via 4 and is fed to the aerobic reactor 6. Nutrients for the biomass can be added, if necessary, at 4.

In the aerobic reactor 6, sulphide in the wash liquid is converted mainly to sulphur by means of bacteria and oxygen. The reactor is supplied with air via aeration system 7. The spent air can usually be released via 8 into the outside air without any problem.

Some of the effluent from the aerobic reactor 6 is used as wash liquid for the gas scrubber 5. The remainder is fed via 10 to the sulphur separator 11, in which the bulk of the sulphur is removed therefrom. The sulphur slurry separated off is removed via 12, dehydrated and, if necessary, purified for re-use.

Stream 13, which contains sulphate/sulphite, is fed to the anaerobic reactor 17. An electron donor is added via 15. In the case of a gaseous electron donor, a discharge gas is released via 16 and optionally partially recycled. In the anaerobic reactor sulphate and sulphite are converted to sulphide. The effluent is recycled via 14 to the aerobic reactor 6 where the sulphide is again converted mainly to sulphur. A small discharge 18 is necessary to prevent accumulation of pollutant, non-degradable components. If the discharge is located downstream of the anaerobic reactor, as in FIG. 1, this will contain sulphide and usually has to be subjected to an after-treatment. If the discharge of low concentrations of sulphate is acceptable, the discharge can be located at the level of line 13 and this does not require any after-treatment.

In the case of Claus off-gas described here, the polluted gas also contains COS and/or $CS_2$ and the treated gas is no longer used (it is usually burnt off). The gas is then subjected to an after-treatment downstream of 5 in a biological trickling filter installation 19. To this end, air is supplied via 21 to filter installation 19, which contains a biomass similar to that in the aerobic reactor 6. COS and $CS_2$ residues are absorbed here and converted essentially into sulphur and/or sulphate, and $CO_2$. The treated gas is discharged via 20. The wash water from the bio-scrubber originates from the aerobic reactor via 22 and is returned to the aerobic reactor via 23. The results of the treatment according to this example are shown in the table below.

TABLE

| Stream | | Example 1 | Example 2 | Example 3 |
|---|---|---|---|---|
| 1 | flow rate | 5000 Nm³/h | 13500 m³/h* | 1500 m³/h* |
| | $H_2S$ (vol. %) | 0.4 | 0.3 | 0.3 |
| | $SO_2$ (vol. %) | 0.2 | — | — |
| | COS (ppm) | 500 | — | 400 |
| | $CS_2$ (ppm) | 280 | — | — |
| | $NH_3$ (ppm) | — | — | 150 |
| | HCN (ppm) | — | — | 150 |
| 2 | $H_2S$ (ppm) | <5 | <5 | |
| | $SO_2$ (ppm) | <5 | — | |
| 20 | $H_2S$ (ppm) | 0 | n/a | <5 |
| | COS (ppm) | 125 | n/a | 100 |
| | $CS_2$ (ppm) | 140 | n/a | |
| | $NH_3$ (ppm) | — | n/a | <5 |
| | HCN (ppm) | — | n/a | <5 |
| 33/34 | flow rate (m³/h) | n/a | n/a | 85 |

TABLE-continued

| Stream | | Example 1 | Example 2 | Example 3 |
|---|---|---|---|---|
| 3/4 | flow rate (m³/h) | 85 | 1450 | 1530 |
| 22/23 | flow rate (m³/h) | 20 | n/a | 85 |
| 12 | 10% S slurry | 0.4 | 10 | 10 |
| 13 | flow rate (m³/h) | 25 | 150 | |
| | $SO_4^{2-}$ (g/l) | 2 | 2 | |
| 15 | $H_2$ flow rate | 7 | 150 | 230 |
| 18 | discharge (m³/h) | 1.4 | 3 | |
| Reactor 6 | volume (m³) | 200 | 4500 | 4500 |
| Reactor 36 | volume (m³) | n/a | n/a | 450 |
| Reactor 17 | volume (m³) | 70 | 475 | 750 |

*at 20 bar

EXAMPLE 2

Removal of sulphur compounds in the absence of significant amounts of nitrogen compounds.

Fuel gas containing $H_2$ and CO as main constituents and containing $H_2S$ as the main pollutant is treated in an installation as shown in FIG. 1, in which, however, the trickling filter 19 with associated facilities 20–23 has been dispensed with.

The results of the treatment according to this example are shown in the table below.

EXAMPLE 3

Removal of sulphur compounds and nitrogen compounds

Fuel gas (synthesis gas) containing $H_2$ and CO as the main constituents and containing $H_2S$, COS, $NH_3$ and HCN as the main pollutants is treated in an installation as shown in FIG. 2.

The polluted gas passes via line 1 into the bottom of gas scrubber 31, where in the main $NH_3$ is washed out of the gas with wash liquid which is supplied via 33 from aerobic reactor 36. The partially treated gas leaves the scrubber at the top and is fed via line 32 to the gas scrubber 5, where the bulk of $H_2S$ and HCN is removed using wash liquid 3. In order to remove COS and residual $H_2S$ and HCN, the gas is fed via 2 to gas scrubber 30, where it is washed with wash liquid supplied via 22. The wash liquid for scrubbers 5 and 30 originates from the aerobic reactor 6.

The loaded wash liquids 34, 4 and 23 leave the scrubbers at the bottom and are fed to the aerobic reactor 6. In the aerobic reactor 6 sulphide in the wash liquid is converted mainly to sulphur by bacteria and oxygen. Only a small portion of the ammonia is oxidised to nitrate here. The reactor is supplied with air via aeration system 7. The spent air can be fed via 8 to the second aerobic reactor and re-used for oxidation.

A portion of the effluent from the aerobic reactor 6 is used as wash liquid for the gas scrubbers 5 and 30. The remaining portion is fed via 10 to the sulphur separator 11, where the bulk of the sulphur is removed therefrom. The sulphur slurry separated off is discharged via 12, dehydrated and, if necessary, purified for re-use.

The effluent from the sulphur separator is fed via 13 to the second aerobic reactor 36. With the aid of bacteria and oxygen, the residual ammonia is converted to nitrate. The reactor is supplied with air via an aeration system. To this end, the off-gas 8 from the first aerobic reactor is supplemented with air stream 35. The spent air can usually be released via 37 into the outside air without any problem.

The effluent from the aerobic reactor 36 is tapped off via 38 and a portion is used as wash liquid 33 for the gas scrubber 31. The remaining portion is fed via 39 to the anaerobic reactor 17. An electron donor is added via 15. In the case of a gaseous electron donor, a discharge gas is released via 16 and, optionally, a portion of this gas is recycled. In the anaerobic reactor 17 sulphate is converted to sulphide.

The effluent is returned via 14 to the aerobic reactor 6, where the sulphide is again mainly converted to sulphur. A small discharge 18 is required to prevent accumulation of pollutant, non-degradable components. Said discharge must be after-treated if necessary.

The results of the treatment according to this example are shown in the table above.

I claim:

1. Process for the treatment of a gas containing hydrogen sulphide, the gas being washed in a first gas scrubber (5) with an alkaline wash liquid and the spent wash liquid being treated in a first aerobic reactor (6) with oxygen in the presence of sulphide-oxidising bacteria and the effluent from the first aerobic reactor (6) being re-used as wash liquid and elementary sulphur formed during the treatment with oxygen being removed from the effluent, characterised in that the effluent from which sulphur has been separated off is treated in an anaerobic reactor (17) with sulphate-reducing bacteria and returned to the first aerobic reactor (5).

2. Process according to claim 1, wherein the wash liquid in the first gas scrubber (5) has a pH of 8–9.5.

3. Process according to claim 1 wherein an electron donor such as hydrogen or a readily oxidisable organic substance is added to the anaerobic reactor (17).

4. Process according to claim 1 wherein the gas containing hydrogen sulphide also contains sulphur dioxide.

5. Process according to claim 1 wherein the gas containing hydrogen sulphide also contains ammonia and the gas is washed in a second gas scrubber (31) with a wash liquid and the spent wash liquid from the second gas scrubber (31) is treated together with the spent wash liquid from the first gas scrubber (5).

6. Process according to claim 5, wherein the gas is first washed in the second gas scrubber (31) and the wash liquid in the second gas scrubber has a pH of 6–8.5.

7. Process according to claim 5 wherein the spent wash liquid from which sulphur has been separated off is treated with nitrifying bacteria in a second aerobic reactor (36) prior to the treatment in the anaerobic reactor.

8. Process according to claim 7, wherein the effluent from the second aerobic reactor (36) is used as wash liquid in the second gas scrubber (31).

9. Process according to claim 1 wherein the gas also contains hydrocyanic acid and the alkaline wash liquid is also provided with 1–50 g elementary sulphur per 1.

10. Process according to claim 1 wherein the gas also contains carbonyl sulphide and the first gas scrubber (5) is constructed in duplicate (5, 19/30).

11. Process according to claim 1 wherein the gas contains less than 5% carbon dioxide, and carbon dioxide, (bi)carbonate or an organic substance which can be reacted to form (bi)carbonate is added to the wash liquid.

12. Installation for carrying out the process according to claim 1, comprising at least one gas scrubber with feed and discharge lines for gas and means for the supply, distribution, collection and removal of wash liquid, said at least one gas scrubber being connected downstream through liquid lines with a first of at least one aerobic reactor with gas feed lines and gas discharge lines and means for the supply and removal of liquid, the first aerobic reactor being connected downstream with a separator for separating solid from liquid, and the separator being connected downstream with an anaerobic reactor having a feed line for an electron donor and means for the supply and removal of liquid.

* * * * *